United States Patent
Pierce

(10) Patent No.: US 9,943,025 B2
(45) Date of Patent: Apr. 17, 2018

(54) SEED GROWING DEVICE, METHOD, AND SYSTEM

(71) Applicant: Bloombabies Inc., Los Angeles, CA (US)

(72) Inventor: Robert Pierce, Los Angeles, CA (US)

( * ) Notice: Subject to any disclaimer, the term of this patent is extended or adjusted under 35 U.S.C. 154(b) by 387 days.

(21) Appl. No.: 14/660,869

(22) Filed: Mar. 17, 2015

(65) Prior Publication Data
US 2016/0255764 A1    Sep. 8, 2016

Related U.S. Application Data

(60) Provisional application No. 62/127,940, filed on Mar. 4, 2015.

(51) Int. Cl.
*A01C 1/00* (2006.01)
*A01C 1/02* (2006.01)
*A01C 1/06* (2006.01)

(52) U.S. Cl.
CPC . *A01C 1/02* (2013.01); *A01C 1/06* (2013.01)

(58) Field of Classification Search
CPC .................................. A01C 1/02; A01C 1/06
USPC .................................................... 47/61, 66.1
See application file for complete search history.

(56) References Cited

U.S. PATENT DOCUMENTS

| | | | | |
|---|---|---|---|---|
| D24,231 S | * | 4/1895 | Berry | D11/149 |
| D24,232 S | * | 4/1895 | Berry | D11/148 |
| 3,375,607 A | * | 4/1968 | Melvold | A01G 9/1013 47/74 |
| 5,022,182 A | * | 6/1991 | Anderson | A01C 21/00 47/48.5 |
| 8,413,374 B2 | * | 4/2013 | Emalfarb | A01G 9/02 206/423 |
| 8,458,955 B2 | * | 6/2013 | Larsen | A01C 1/04 47/65.5 |
| 2006/0150489 A1 | * | 7/2006 | Legro | A01C 1/06 47/57.6 |
| 2006/0150498 A1 | * | 7/2006 | Chen | A01G 9/10 47/65.5 |
| 2006/0162251 A1 | * | 7/2006 | Yamaguchi | A01C 1/02 47/58.1 SE |

(Continued)

FOREIGN PATENT DOCUMENTS

| | | | | |
|---|---|---|---|---|
| GB | 2425530 A | * | 11/2006 | A01G 9/1086 |
| WO | WO-0072655 A1 | * | 12/2000 | A01C 1/02 |

*Primary Examiner* — Monica L Williams
*Assistant Examiner* — Aaron M Rodziwicz
(74) *Attorney, Agent, or Firm* — Eric Kelly

(57) ABSTRACT

A seed growing device, method, and system are described. The seed growing device may comprise a solid-shape and a seed-enclosure located within the solid-shape. The solid-shape may comprise a mixture. The mixture may comprise a dry acid and a dry base. The seed-enclosure may comprise a seed and/or spore. The seed-enclosure may comprise an outer-layer that may be dissolvable upon contact with liquid water. When the solid-shape may be sufficiently wetted with liquid water, the dry acid and the dry base may absorb at least some of the liquid water to interact in an aqueous acid base chemical reaction causing bubbling and transitioning the solid-shape from a dry state into a liquid state; and in some embodiments emitting a fragrance. At least some of the liquid water may dissolve the seed-enclosure enough to permit some of the liquid water to reach the seed and initiate seed germination.

15 Claims, 12 Drawing Sheets

(56) References Cited

U.S. PATENT DOCUMENTS

| | | | |
|---|---|---|---|
| 2010/0263274 A1* | 10/2010 | Corak | A01C 1/06 47/57.6 |
| 2011/0162270 A1* | 7/2011 | Larsen | A01C 1/04 47/65.7 |
| 2011/0232182 A1* | 9/2011 | Emalfarb | A01G 9/02 47/65.7 |
| 2011/0232189 A1* | 9/2011 | Bijl | A01G 9/1033 47/59 S |

* cited by examiner

SEED GROWING DEVICE, METHOD, AND SYSTEM

PRIORITY NOTICE

The present application claims priority under 35 U.S.C. § 119(e) to U.S. Provisional Patent Application Ser. No. 62/127,940 filed on Mar. 4, 2015, the disclosure of which is incorporated herein by reference in its entirety.

TECHNICAL FIELD OF THE INVENTION

The present invention relates to devices, apparatuses, methods, and/or systems for growing and/or germinating plant seeds and/or plant spores from a solid-shape, wherein the solid-shape may be triggered to dissolve in an aqueous acid base chemical reaction producing bubbles and/or fizzing to expose the plant seeds and/or the plant spores; wherein the plant seeds and/or the plant spores may be wetted to initiate germination.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Presently, germination of plant seeds of flowering plants and/or of plant spores from non-flowering plants, may generally involve wetting the seed and/or spore to trigger germination. Such a process may generally involve a given seed and/or a given spore, a moisture source, and a growth medium. Often the moisture source may be water that may have wetted the growth medium, which may then retain some of the water. The growth medium may comprise: soil, potting soil, gardening soil, peat, moss, gravel, sand, vermiculite, fertilizer, manure, paper products (e.g. paper towels, napkins, tissues, and the like), fabrics, textiles, linens, and the like. Once the seed and/or the spore may be brought into contact with sufficient moisture, germination may initiate and then subsequent growth may be dictated by temperature, moisture content of the growth medium, and presence of light/dark cycles, the severity of such light, and possibility an applicable growing zone if not using artificial light and/or temperature sources.

However, the process of initiating seed and/or spore germination has historically and presently remains relatively benign, boring and uninteresting. Aside from wetting the seed and/or the spore in a growth medium, there is little to see and/or do.

There then is need in the art for devices, apparatuses, methods, and/or systems of initiating germination in a way which may be exciting, interesting—providing a dynamic visual event to observe and possibly specific smells to smell. For example, there is a need in the art for a solid container with a specific shape, that may comprise one or more seeds (spores), wherein the solid container with the specific shape may be triggered to dissolve in an aqueous acid base chemical reaction producing bubbles and fizzing to expose the plant seeds (and/or plant spores); wherein the wetted plant seeds (and/or wetted plant spores) may be wetted to initiate germination. And in some embodiments, the bubbles and fizzing may also emit specific smells (odors and/or fragrances). The specific shape may be a shape not traditionally associated with growing plants and thus it housing seeds (spores) which may germinate after the specific shape dissolves, may offer a pleasant surprise to the user.

It is to these ends that the present invention has been developed.

BRIEF SUMMARY OF THE INVENTION

To minimize the limitations in the prior art, and to minimize other limitations that will be apparent upon reading and understanding the present specification, the present invention may describe seed growing devices, apparatuses, methods, and/or systems.

In some embodiments, the devices, apparatuses, methods, and/or systems for growing and/or germinating plant seeds and/or plant spores may comprise a solid-shape, wherein the solid-shape may be triggered to dissolve in an aqueous acid base chemical reaction producing bubbles and/or fizzing to expose the plant seeds and/or the plant spores; wherein the plant seeds and/or the plant spores may be wetted to initiate germination In some embodiments, the seed growing device may comprise the solid-shape and a seed-enclosure located within the solid-shape. In some embodiments, the solid-shape may comprise a mixture. In some embodiments, the mixture may comprise a dry acid and a dry base. In some embodiments, the seed-enclosure may comprise at least one plant seed and/or at least one plant spore. In some embodiments, the seed-enclosure may comprise an outer-layer that may be dissolvable upon contact with liquid water. In some embodiments, when the solid-shape may be sufficiently wetted with liquid water, the dry acid and the dry base may absorb at least some of the liquid water to interact in the aqueous acid base chemical reaction causing bubbling and transitioning the solid-shape from a dry state into a liquid state; and in some embodiments emitting a fragrance. In some embodiments, at least some of the liquid water may dissolve the seed-enclosure enough to permit some of the liquid water to reach the seed and initiate seed germination.

It is an objective of the present invention to provide exciting and/or interesting devices, apparatuses, methods, and/or systems for growing and/or germinating plant seeds and/or plant spores apart from merely wetting the seeds and/or the spores.

It is another objective of the present invention to provide exciting and/or interesting devices, apparatuses, methods, and/or systems for growing and/or germinating plant seeds and/or plant spores which may comprise a dynamic visual event to observe as a precursor to germination or which may occur concurrently with initiating germination; wherein the dynamic visual event may be integral to the process of initiating germination.

It is another objective of the present invention to provide exciting and/or interesting devices, apparatuses, methods, and/or systems for growing and/or germinating plant seeds and/or plant spores wherein the dynamic visual event may comprise observing an acid base chemical reaction, that may result in bubbling and/or fizzing.

It is another objective of the present invention to provide exciting and/or interesting devices, apparatuses, methods, and/or systems for growing and/or germinating plant seeds and/or plant spores wherein the dynamic visual event may comprise observing dissolving and/or disintegration of a solid shape, wherein the solid shape may house the seeds (and/or spores).

It is another objective of the present invention to provide exciting and/or interesting devices, apparatuses, methods, and/or systems for growing and/or germinating plant seeds and/or plant spores wherein the dynamic visual event may further comprise display of at least color upon dissolving and/or disintegration of the solid shape.

It is another objective of the present invention to provide exciting and/or interesting devices, apparatuses, methods, and/or systems for growing and/or germinating plant seeds and/or plant spores wherein the dynamic visual event may also comprise experiencing a dynamic olfactory event, from the dissolving and/or disintegration of the solid shape to emit at least one specific odor, smell, and/or fragrance. Such odors, smells, and/or fragrances may be intentionally included in a formulation of the solid shape.

It is another objective of the present invention to provide devices, apparatuses, methods, and/or systems for growing and/or germinating plant seeds and/or plant spores wherein the solid shape may comprise a solid container with a specific shape, wherein the solid container with the specific shape may be triggered to dissolve in the aqueous acid base chemical reaction producing bubbles and/or fizzing to expose the plant seeds and/or the plant spores; wherein the plant seeds and/or the plant spore may be wetted to initiate germination.

It is another objective of the present invention to provide the solid shape in a range of different and diverse shapes, such as, but without limitation: regular polygons, irregular polygons, ovoids, cylinders, spheres, cones, and the like; wherein polygons may comprise: rectangular prisms, cubes, triangular prisms, square pyramids, triangular pyramids, star shapes, and the like.

It is another objective of the present invention to provide the solid shape in an ovoid shape that mimics (e.g. in terms of shape, size, texture, and/or color) a shape of a bird egg (e.g. a chicken egg) or a reptile egg.

It is another objective of the present invention to provide a range of different and/or diverse types of plant seeds and/or plant spores which may be removably housed (contained) within the solid shape, i.e. within the solid container with the specific shape.

It is another objective of the present invention to provide a plurality of plant seeds and/or plant spores which may be removably housed (contained) within the solid shape, i.e. within the solid container with the specific shape.

It is yet another objective of the present invention to provide a secondary enclosure which may removably reside within the solid shape, wherein the secondary-layer may comprise the at least one seed (or spore); and wherein an outer-layer of the secondary-layer may dissolve at a different rate that a rate of dissolving associated with the solid shape upon contact with liquid water.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1A:
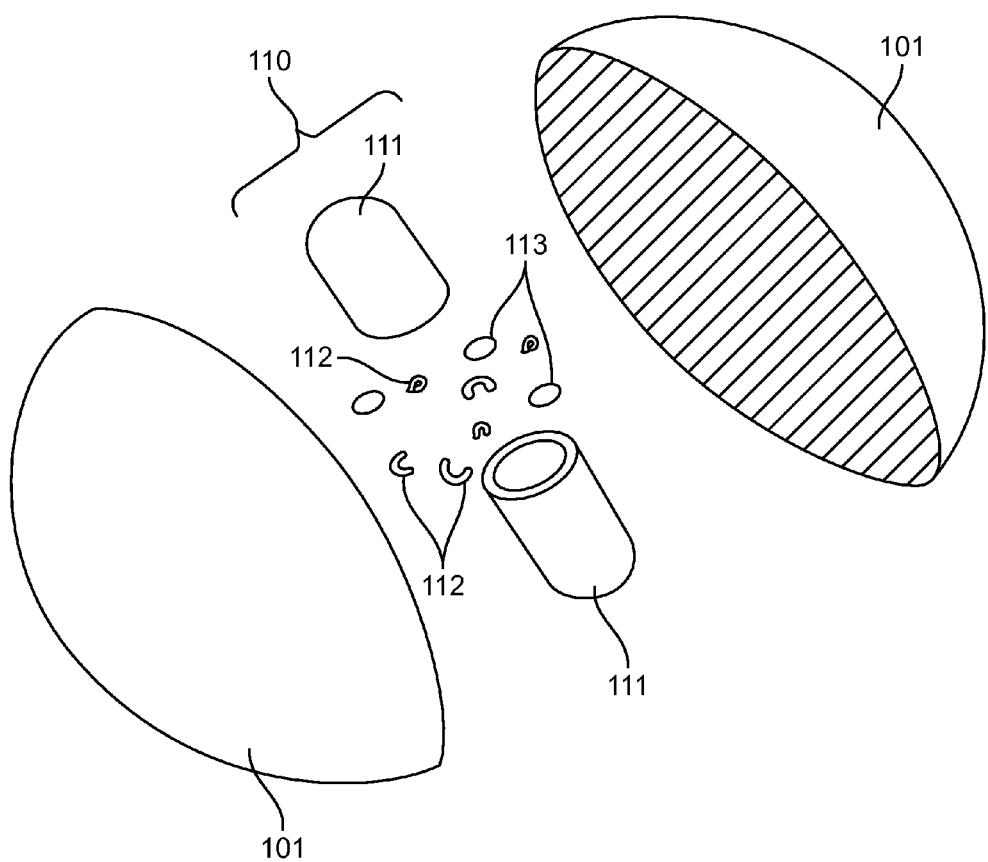
FIG. 1A may depict an exploded perspective view of an exemplary embodiment of a seed growing device.

REFERENCE NUMERAL SCHEDULE 100 seed growing device 100
101 solid-shape 101
102 three dimensional shape 102
110 seed-enclosure 110
111 at least one liquid water dissolvable capsule 111 (outer-layer 111)
112 at least one seed 112 (seed 112)
113 at least one water gel bead 113
200 method for manufacturing 200

202 adding dry acid 202
204 adding dry base 204
206 adding binding agent 206
210 preparing egg white mixture 210
220 loading first-mold 220
230 loading second-mold 230
240 preparing yolk 240
250 loading yolk (seed-enclosure 110) into first-mold 250
260 compressing molds 260
270 drying egg 270
280 packaging egg 280
300 method for using 300
305 receiving egg into receiving vessel 305
310 receiving water onto egg 310
315 receiving egg into receiving vessel with water 315
320 if then logic operator 320
330 receiving sprouted seed(s) in appropriate growth environment 330
340 receiving water onto seed puck 340
350 receiving seed-enclosure into seed puck 350
360 receiving shoot after sprouting 360
401 receiving vessel 401
402 growth medium 402
403 liquid water 403
425 solid-shape in state of dissolving and bubbling 425
450 at least one living flowering plant 450
501 egg crate packaging 501
502 single cell 502
503 lid 503
600 seed growing device 600
700 seed growing device 700
701 exterior shell 701
752 exterior surface 752
753 interior surface 753
755 at least one entrance/exit hole 755
800 method 800 of slip casting exterior shell 701
810 closing appropriate mold 810
820 pouring applicable slip material 820
830 partial curing 830
840 draining uncured applicable slip material 840
850 inserting seed(s) 850
860 drying newly formed exterior shell 860
870 releasing appropriate mold 870
900 at least one seed puck 900 (seed puck(s) 900)

DETAILED DESCRIPTION OF THE INVENTION

The present invention may comprise various embodiments of devices, apparatuses, methods, and/or systems for growing and/or germinating plant seeds and/or plant spores. In some embodiments, the devices, apparatuses, methods, and/or systems for growing and/or germinating plant seeds and/or plant spores may comprise a solid-shape, wherein the solid-shape may be triggered to dissolve in an aqueous acid base chemical reaction producing bubbles and/or fizzing to expose the plant seeds and/or the plant spores removably contained therein; wherein the plant seeds and/or the plant spores may be wetted to initiate germination.

Note, in some embodiments, reference to the solid-shape, may be a reference to a phase of the shape, as in gas phase, liquid phase, solid phase, and combinations thereof. Thus, in some embodiments, the solid-shape may be substantially a solid phase shape. Whereas, reference to the solid-shape is not necessarily a suggestion that a density of the solid-shape may be constant or homogeneous. For example, and without limiting the scope of the present invention, some regions of an interior of the solid-shape may have a foam or foam like physical structure, i.e. that of a plurality of cells (cavities).

In some embodiments, the seed growing device may comprise the solid-shape and a seed-enclosure located within the solid-shape. In some embodiments, the solid-shape may comprise a mixture. In some embodiments, the mixture may comprise a dry acid and a dry base. In some embodiments, the seed-enclosure may comprise at least one plant seed and/or at least one plant spore. In some embodiments, the seed-enclosure may comprise an outer-layer that may be dissolvable upon contact with liquid water. In some embodiments, when the solid-shape may be sufficiently wetted with liquid water, the dry acid and the dry base may absorb at least some of the liquid water to interact in the aqueous acid base chemical reaction causing bubbling and transitioning of the solid-shape from a dry state into a liquid state; and in some embodiments emitting a fragrance. In some embodiments, at least some of the liquid water may dissolve the seed-enclosure enough to permit some of the liquid water to reach the seed and initiate seed germination.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1B:
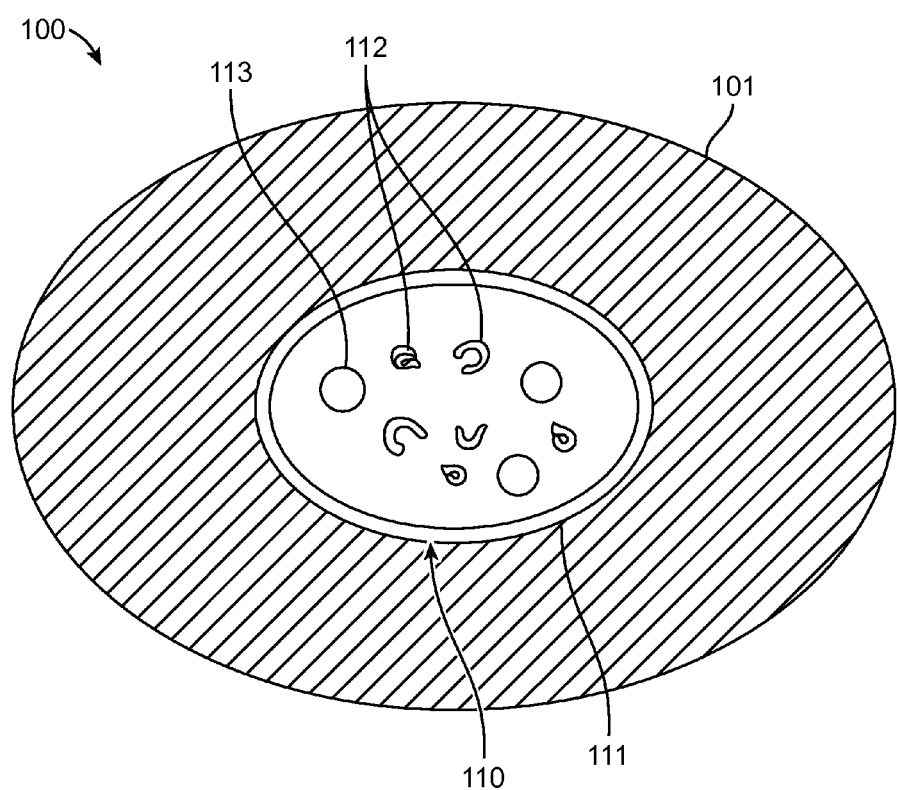
FIG. 1B may depict a cross sectional longitudinal side view of the exemplary embodiment of the seed growing device.

FIG. 1A may depict an exploded perspective view of an exemplary embodiment of a seed growing device 100. Note, in practice, once seed growing device 100 may be formed, separation into two approximate hemispheres as depicted in FIG. 1A may not be readily feasible, i.e. the depiction shown in FIG. 1A may be to depict various contents of seed growing device 100. FIG. 1B may depict a cross sectional longitudinal side view of the exemplary embodiment of seed growing device 100.

In some exemplary embodiments, seed growing device 100 may comprise a solid-shape 101 and a seed-enclosure 110. In some embodiments, when solid-shape 101 may be cured (e.g. dried, compressed, and formed), seed-enclosure 110 may be entirely encapsulated (i.e. surrounded and bounded) by solid-shape 101.

In some embodiments, when solid-shape 101 may be dry (and compressed in some embodiments), solid-shape 101 may exist as a solid, as in a solid phase. In some embodiments, solid-shape 101 may comprise a mixture. In some embodiments, the mixture may comprise at least a dry acid and at least a dry base.

In some embodiments, seed-enclosure 110 may comprise seed-enclosure contents. In some embodiments, the seed-enclosure contents may comprise at least one seed 112. In some exemplary embodiments, an outer-layer 111 of seed-enclosure 110 may be dissolvable upon physical contact with liquid water. (Outer-layer 111 may also be at least one liquid water dissolvable capsule 111 in some embodiments.)

In some exemplary embodiments, when the liquid water may be poured onto solid-shape 101 (or solid-shape 101 may otherwise be wetted with sufficient liquid water), the dry acid and the dry base may absorb at least some of the liquid water to initiate and interact in an aqueous acid base chemical reaction. This aqueous acid base chemical reaction may result in bubbling and/or fizzing; and in transitioning solid-shape 101 from a dry and solid state into a liquid state (or liquid state with active bubble formation or pasty state). Further, in some exemplary embodiments, at least some of the liquid water may dissolve outer-layer 111 of seed-enclosure 110 enough to permit some of the liquid water to reach at least one seed 112 and initiate seed 112 germination.

Note, in terms of time it may take to dissolve, in some exemplary embodiments, solid-shape 101 may dissolve at least one order of magnitude faster than it may take to dissolve outer-layer 111. For example, and without limiting the scope of the present invention, if it takes solid-shape 101 about one minute to dissolve upon contact with the liquid water, then it may take outer-layer 111 at least ten minutes to dissolve. In some exemplary embodiments, it may take about three days for outer-layer 111 to dissolve, where "about" in this context may mean plus or minus two days.

In some embodiments, the dry acid may be citric acid. In some embodiments, the citric acid may initially be in a powder form, i.e. prior to formation into solid-shape 101. Citric acid may be a weak organic acid. In some embodiments, other weak organic acids in powder form may be substituted in place of citric acid. For example, and without limiting the scope o the present invention, acetic acid in powder form may be utilized as the dry acid. In some embodiments, the dry base may be baking soda. In some embodiments, the baking soda may initially be in a powder form, i.e. prior to formation into solid-shape 101. Chemically baking soda may be sodium bicarbonate, a base.

Figure 4A:
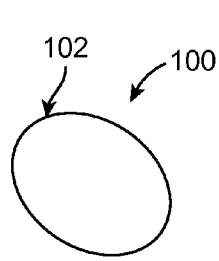
FIG. 4A may depict an exemplary embodiment of the seed growing device, shown from a perspective view.
Figure 4B:
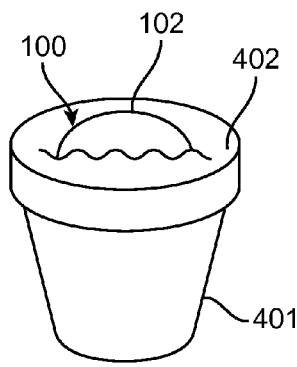
FIG. 4B may depict the exemplary embodiment of the seed growing device wherein the seed growing device may be received into a receiving vessel, shown from a perspective view.
Figure 4C:
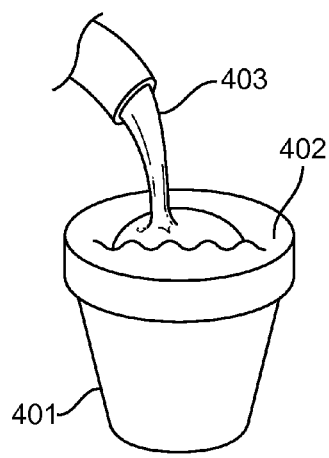
FIG. 4C may depict the exemplary embodiment of the seed growing device wherein the seed growing device may be receiving liquid water, shown from a perspective view.
Figure 4D:
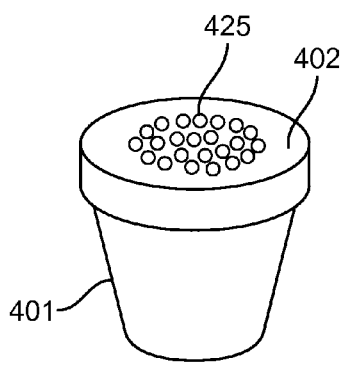
FIG. 4D may depict the exemplary embodiment of the seed growing device wherein a solid-shape of the seed growing device may be bubbling and dissolving upon becoming wet from the liquid water, shown from a perspective view.

In embodiments wherein the mixture of the dry acid may be citric acid and the dry base may be baking soda, addition of liquid water to the mixture may prompt the aqueous acid base reaction which as a byproduct may form carbon dioxide gas, which may be responsible for the bubbling and/or fizzing (see e.g., FIG. 4D). This particular aqueous acid base reaction is also endothermic.

In some embodiments, the mixture (which be may formed into solid-shape 101) may comprise one or more of the group comprising: a binding agent, a sugar, a fragrance, a surfactant, witch hazel, isopropyl alcohol (e.g. rubbing alcohol), and the like.

In some embodiments, the binding agent may serve to facilitate compression of the dry acid and the dry base into a solid and three dimensional shape 102 which may be stable. (depicted in FIG. 4A). In some embodiments, the binding agent may be corn starch.

In some embodiments, the sugar may be a white colored sugar, such as cane sugar and/or powdered sugar. In some embodiments, the sugar may be a brown colored sugar, such as brown sugar. In some embodiments, the sugar may act partially as a colorant. In some embodiments, the sugar may be the binding agent or one of the binding agents. In some embodiments, the sugar may assist in protecting at least one seed 112 from damage arising from the aqueous acid base chemical reaction. In some embodiments, the sugar may partially act as a filler. In some embodiments, the sugar may act partially as a desiccant.

In some embodiments, presence of surfactants in the mixture may lower surface tension which in turn may facilitate bubble formation while the aqueous acid base chemical reaction may be in progress. In some embodiments, such surfactants may be present in the mixture in a dry form and/or in a dry powder form. In some embodiments, such surfactants may comprise soaps.

In some embodiments, the witch hazel may be sprayed sparingly into a dry mixture of at least the dry acid and the dry base, which may facilitate initial binding of the mixture into three dimensional shape 102 by compression within a mold or other compression shape tooling. However, if too much witch hazel may be sprayed onto the mixture, then the aqueous acid base reaction may be unintentionally and prematurely initiated. In some embodiments, the witch hazel may be about a 50/50 by volume mixture of witch hazel and isopropyl alcohol, wherein the isopropyl alcohol tends to prevent premature of initiation of the aqueous acid base chemical reaction when the 50/50 witch hazel spray may be sprayed onto the dry acid and dry base mixture (because the isopropyl alcohol evaporates faster than an equivalent volume of water and also because the isopropyl alcohol is not water).

In some embodiments, the fragrance may be added to the mixture, such that upon wetting of solid-shape 101 with the liquid water, volatile chemicals of the fragrance may be emitted such that a user nearby (e.g. within five feet in some embodiments, or within ten feet in some embodiments) may be experience a smell (odor) of the fragrance as the solid-shape 101 dissolves. In some embodiments, the fragrance may be added to the mixture in a powder form and/or a dry form, so as not to prematurely initiate the aqueous acid base reaction. In some embodiments, the fragrance may be added to the mixture in an oil based form, which may also not prematurely initiate the aqueous acid base reaction.

In some exemplary embodiments, the mixture may comprise about, by volume: 22% citric acid, 44% baking soda, 22% sugar, and about 4% to about 12% corn starch. Note, this 1:2 ratio of dry acid to dry base may be maintained, while increasing or decreasing the amount of dry acid and dry base to reach 100% as the amounts of the other ingredients may be varied per above. In some exemplary embodiments, about 80 mL of such a dry mixture may be used to form a given three dimensional shape 102 that may be chicken egg shaped. In some embodiments, one to five drops of the fragrance may be added to each 80 mL of such dry mixture. In some exemplary embodiments, to each 80 mL of dry mixture, spray three to six sprays of a 50/50 mix by volume of witch hazel to isopropyl alcohol from a standard hand held and hand actuated liquid sprayer. This 50/50 mix may evaporate quickly, but may facilitate molding of solid-shape 101 into three dimensional shape 102.

In some embodiments, solid-shape 101 may comprise three dimensional shape 102, which may be a stable shape. In some embodiments, three dimensional shape 102 may be formed by solid-shape 101 being molded into three dimensional shape 102 by use of various molds, compression tooling, and/or presses, including manual presses and/or hand presses in some embodiments. In some embodiments, three dimensional shape 102 (and/or solid-shape 101) may be selected from the group comprising: regular polygons, irregular polygons, ovoids, cylinders, spheres, cones, and the like. Herein, polygons may comprise: rectangular prisms, cubes, triangular prisms, square pyramids, triangular pyramids, star shapes, and the like.

In some embodiments, three dimensional shape 102 (and/or solid-shape 101) when an elongate member (e.g., but not limited no, a cylinder), may be formed by various extrusion processes.

In some embodiments, three dimensional shape 102 (and/or solid-shape 101) may be selected from the group comprising: various animal shapes, including vertebrate animals and/or invertebrate animals, and the like. In some embodiments, the animal shape may be that of a stuffed animal, such as, but not limited to, a teddy bear, a rabbit, and the like. In some embodiments, the animal shape may comprise fantasy animal, such as, but not limited to, unicorns, dragons, mermaids, and the like.

In some exemplary embodiments, three dimensional shape 102 (and/or solid-shape 101) may substantially approximate an ovoid shape, such as a shape of a chicken egg. See e.g., FIG. 4A. In some embodiments, three dimensional shape 102 (and/or solid-shape 101) may substantially approximate a size of the chicken egg. In some embodiments, the ovoid shape of three dimensional shape 102 (and/or solid-shape 101) may substantially approximate the shape and/or size of other animal eggs, such as other bird eggs, reptile eggs, and the like. Note, oval and/or spherical shapes may be included within the term "ovoid" as used herein. Other shapes of three dimensional shape 102 (and/or solid-shape 101) may be limited by difficulties in filling the mold with the mixture.

In some embodiments, solid-shape 101 may be as small as about a size (in terms of volume and/or shape) of a pea, a sparrow's egg, and/or a robin's egg. In some embodiments, solid-shape 101 may be as large as about a size of a NBA regulation basketball.

In some embodiments, solid-shape 101 may be substantially a white color to mimic a color of cooked chicken egg whites or of some chicken egg shells. For example, and without limiting the scope of the present invention, citric acid, baking soda, corn starch, and cane sugar may all be the color white, which may aid in seed growing device 100 mimicking the look of chicken eggs. In some embodiments, an exterior of solid-shape 101 may be substantially a color and/or pattern of other animal eggs, to mimic a look of such other animal eggs.

Continuing discussing FIG. 1A and FIG. 1B, in some embodiments, seed-enclosure 110 may comprise an outer-layer 111. In some embodiments, outer-layer 111 may be at least one liquid water dissolvable capsule 111. For example, and without limiting the scope of the present invention, in some embodiments, outer-layer 111 may be a capsule or a gel-cap, such as a 000 size gel cap. In other embodiments, other gel cap sizes may be used. In some embodiments, the capsule or the gel cap may be substantially constructed of gelatin, starch, and/or cellulose. In some embodiments, outer-layer 111 (e.g. at least one liquid water dissolvable capsule 111) may comprise a three dimensional shape, sized to fit entirely with three dimensional shape 102 of solid-shape 101 (which in some embodiments may occupy about 80 mL of volume). In some embodiments, this three dimensional shape for outer-layer 111 may be selected from the group comprising: regular polygons, irregular polygons, ovoids, cylinders, spheres, cones, and the like. Again as noted, herein, polygons may comprise: rectangular prisms, cubes, triangular prisms, square pyramids, triangular pyramids, star shapes, and the like. In some embodiments, outer-layer 111 may comprise an ovoid or cylindrical shape, common to liquid water dissolvable capsules (see e.g., FIG. 1A and FIG. 1B).

In some embodiments, at least one seed 112 may be of at least one type of flowering plant. In some embodiments, there may be a plurality of seeds 112 within seed-enclosure 110 in the seed-enclosure contents. In some embodiments, such a plurality of seeds 112 may be of a single type of flowering plant. For example, and without limiting the scope of the present invention, the single type of flowering plant may be Calendula. In some embodiments, the at least one type of flowering plant may be an ornamental flowering plant and/or a herb plant. In some embodiments, the at least one type of flowering plant may be two different types of flowering plants. In some embodiments, the two types of flowering plants may be Alyssum and Calendula. In some embodiments, the at least one type of flowering plant may be up to one dozen (12) different types of flowering plants, with each type in various quantities.

For example and without limiting the scope of the present invention, in some embodiments, seed-enclosure 110 may comprise fifteen Alyssum seeds 112 and five Calendula seeds 112.

In some embodiments, at least one seed 112 may be actually be at least one spore of a non-flowering plant. In some embodiments, the non-flowering plant may be a gymnosperm, such as conifers, cycads, ginkos, and the like. In some embodiments, the non-flowering plant may be true ferns, horsetails, and the like. In some embodiments, the plurality of seeds 112 may comprise both seeds 112 of flowering plants and spores of non-flowering plants.

In some embodiments, at least one seed 112 may be of a plant type which may grow into a ground covering, a shrub, a tree, and/or a vine.

In some embodiments, seed(s) 112 may be dispersed within the mixture of dry acid and dry base. In some such embodiments, there may be no seed-enclosure 110 and no outer-layer 111 (see e.g., FIG. 6).

Continuing discussing FIG. 1A and FIG. 1B, in some embodiments, the seed-enclosure contents may comprise at least one water gel bead 113 (water bead 113) sized to fit within seed-enclosure 110, i.e. within outer-layer 111. Water gel beads 113 may be water absorbing polymers, generally in a spherical shape and capable of absorbing many times their weight in water (e.g. 300 to 500 times). The presence of water gel beads 113 within seed-enclosure 110 may act as desiccants to prevent or minimize premature germinating and/or sprouting of seeds 112. In some embodiments, at least one water gel bead 113 may comprise a plurality of water gel beads 113. In some embodiments, may be at least one water gel bead 113 various colors. Presence of at least one water gel bead 113 once seeds 112 may have begun germination, may then also provide a source of water moisture to seeds 112.

In some embodiments, the seed-enclosure contents may be in random physical contact with each other. For example, and without limiting the scope of the present invention, at least one water gel bead 113 may be in removable physical contact with the at least one seed 112 and/or with other water gel beads 113; and/or seeds 112 may be removable physical contact with each other as well as water gel beads 113.

In some embodiments, seed-enclosure 110, e.g. outer-layer 111, may be a yellow color to mimic a color of cooked chicken egg yolks. In some embodiments, outer-layer 111 may be colors other than yellow, including more than one color.

Figure 9:
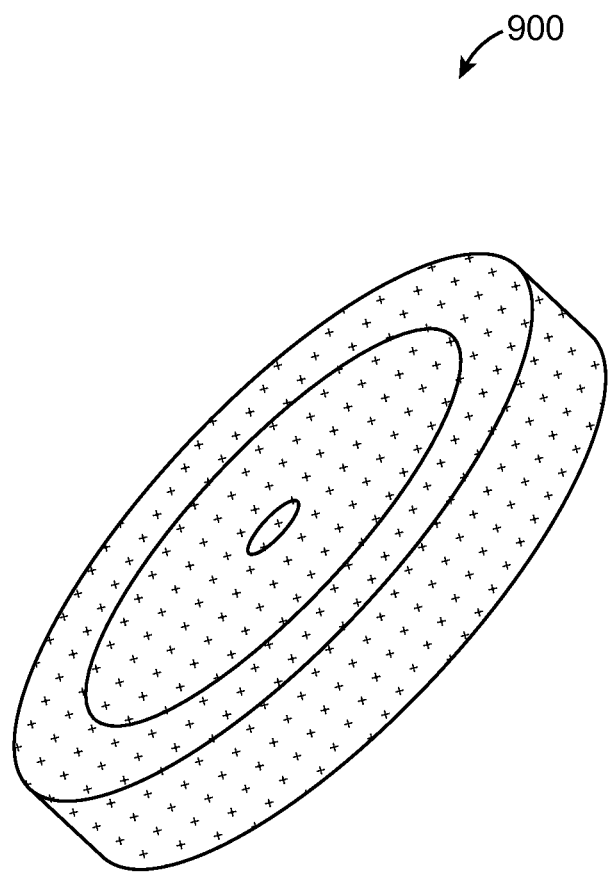
FIG. 9 may depict an exemplary embodiment of at least one seed puck, shown from a perspective view.

FIG. 9 may depict an exemplary embodiment of at least one seed puck 900, shown from a perspective view. In some embodiments, a system utilizing seed growing device 100 may also comprise at least one seed puck 900, see e.g., FIG. 9. At least one seed puck 900 may be a soil puck and/or a peat puck. Soil pucks may be compressed garden and/or potting soil. Peat pucks may be compressed peat (often within a netted enclosure). Such seed puck(s) 900 may be compressed into cylindrical disk shapes. To use, such puck(s) 900, seed puck(s) 900 may generally be hydrated first with liquid water. After hydrating, puck(s) 900 may be used as a hydrated puck(s) 900 for receiving seeds 112, after solid-shape 101 may have dissolved (or dissolved sufficiently to manually remove seed-enclosure 110 from solid-shape 101), but before outer-layer 111 may have dissolved (or dissolved minimally such that seed-enclosure 110 may be handled). In some embodiments, at least one seed puck 900 may be used to receive seed-enclosure 110 upon the solid-shape 101 being activated with liquid water and before outer-layer 111 may completely dissolve. Seed(s) 112 may be inserted into a center of the hydrated seed puck(s) 900, which may require first creating an indentation into the center of seed puck(s) 900.

In some embodiments, prior to packaging of seed growing device 100, seed puck(s) 900 may be treated with the fragrance, such that hydrating the seed puck(s) 900 may release some volatile chemicals of the fragrance.

In embodiments of seed growing device 100 and/or in system embodiments, inclusion of at least one seed puck(s) 900 may be within product packaging, such as inclusion within egg crate packaging 501. In some embodiments, egg crate packaging 501 may comprise at least one seed puck 900. See FIG. 5 series discussion below regarding egg crate packaging 501.

In some embodiments, other growth medium 402 may replace seed puck(s) 900.

In some embodiments, seed growing device 100 may comprise a moisture barrier covering. In some embodiments, the moisture barrier covering may removably entirely cover solid-shape 101, when solid-shape 101 may be in the dry and compressed state of three dimensional shape 102. In some embodiments, the moisture barrier covering may protect solid-shape 101 from moisture and premature initiation of the aqueous acid base chemical reaction. In some embodiments, each individual solid-shape 101 may be entirely removably covered with the moisture barrier covering. In some embodiments, a group of solid-shapes 101 may be collectively covered with the moisture barrier covering.

In some embodiments, the moisture barrier covering may be substantially constructed from a film or sheet of flexible and pliable plastic. Such a plastic may be substantially impermeable to liquid water and/or gaseous water vapor. For example, and without limiting the scope of the present invention, the moisture barrier covering may comprise shrink wrap. Such shrink wrap may be heat activated to shrink and cling to solid-shape 101.

Figure 2:
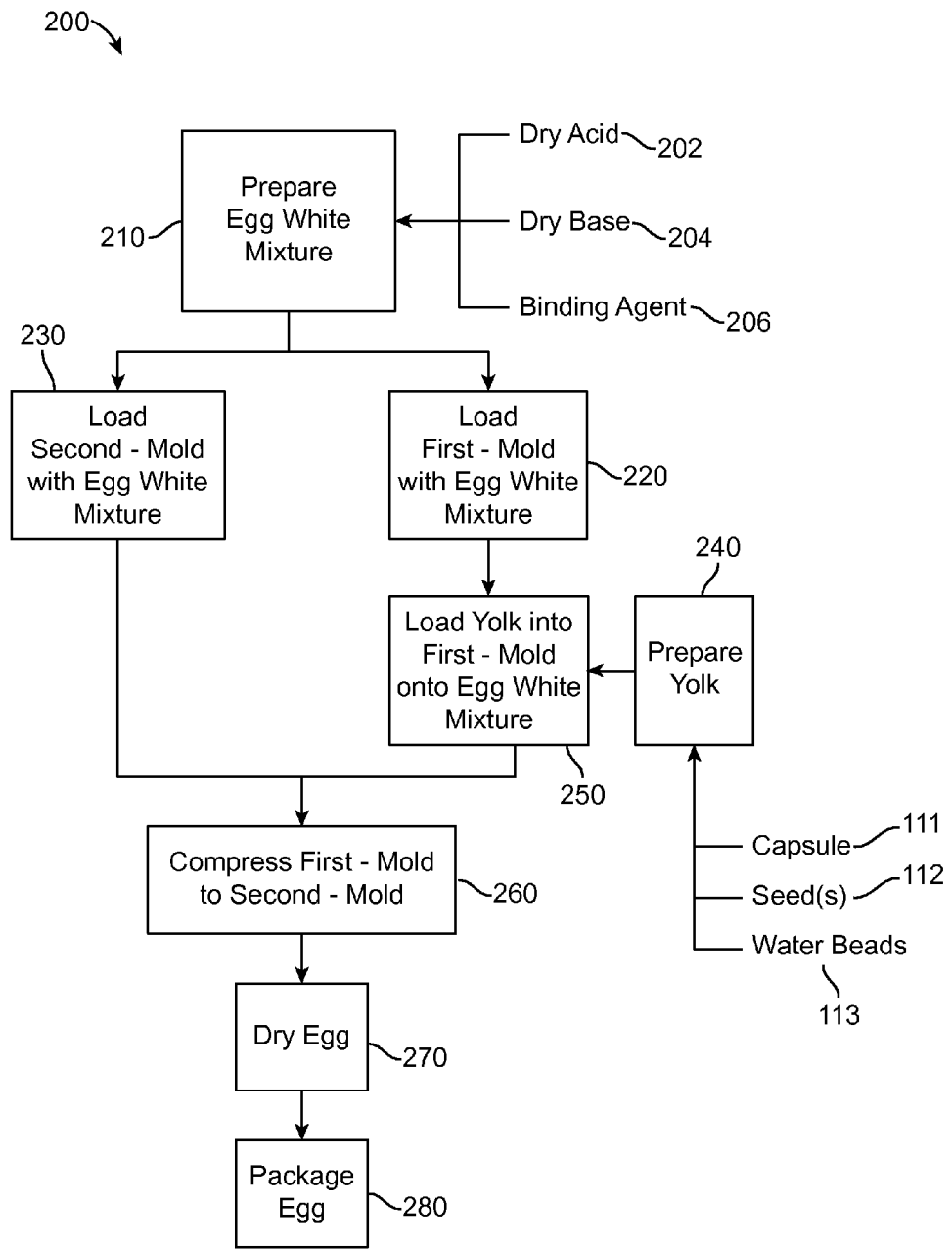
FIG. 2 may depict an exemplary method for manufacturing the exemplary embodiment of the seed growing device.

FIG. 2 may depict an exemplary method 200 for manufacturing the exemplary embodiment of seed growing device 100. Note, solid-shape 101 and/or three dimensional shape 102 may comprise "egg" as "egg" may be used in FIG. 2. Note, the mixture may comprise the term "egg white mixture" as "egg white mixture" may be used in FIG. 2. Note, seed-enclosure 110 may comprise "yolk" as "yolk" may be used in used in FIG. 2. The terms in FIG. 2 of "egg," "egg white mixture," and "yolk," may refer to an exemplary embodiment of seed growing device 100, wherein seed growing device 100 may resemble (mimic) a chicken egg (e.g. resemble in shape, size, and/or color).

In some embodiments, method 200 for manufacturing seed growing device 100 may comprise the steps of:

Step 210—preparing the mixture; wherein the mixture comprises at least the dry acid and the dry base;

Step 240—preparing seed-enclosure 110; wherein seed-enclosure 110 may comprise seed-enclosure contents, wherein the seed-enclosure contents may comprise at least one seed 112;

Step 220—loading a portion of the mixture into a first-mold, wherein the first-mold may be at least three quarters full with the mixture (i.e. it may be desirable to leave some room to receive seed-enclosure 110);

Step 230—loading a second-portion of the mixture into a second-mold; wherein the second-mold may be at least full with the mixture;

Step 250—loading seed-enclosure 110 into the first-mold onto the mixture within the first-mold;

Step 260—compressing the first-mold with the second-mold to form solid-shape 101, wherein solid-shape 101 may comprise three dimensional shape 102; wherein solid-shape 101 may entirely and removably encapsulate seed-enclosure 110;

Step 270—drying solid-shape 101, which now may also comprise seed-enclosure 110; and in some embodiments, Step 280—packaging solid-shape 101 into a container.

In some embodiments, step 240 must precede step 250. In some embodiments, step 210 must precede step 220 and/or step 230. However, in some embodiments, step 210 and step 240 may be performed before or after each other.

In some embodiments, step 210 of preparing the mixture, may comprise the steps of measuring and mixing together at least two of the following group comprising: the dry acid, the dry base, the binding agent, the sugar, the fragrance, the witch hazel, the isopropyl alcohol, and the like. In some embodiments, the minimum ingredients in the mixture may be the dry acid and the dry base.

In some exemplary embodiments, step 210 of preparing the mixture, may comprise the steps of measuring and mixing together the dry acid, the dry base, the binding agent, the sugar, and the witch hazel. Adding the fragrance to the mixture may be optional in some embodiments. Adding the isopropyl alcohol to the mixture may be optional in some embodiments.

In some exemplary embodiments, the mixture may comprise about, by volume: 22% citric acid, 44% baking soda, 22% sugar, and about 4% to about 12% corn starch. Note, this 1:2 ratio of dry acid to dry base may be maintained, while increasing or decreasing the amount of dry acid and dry base to reach 100% as the amounts of the other ingredients may be varied per above. In some exemplary embodiments, about 80 mL of such a dry mixture may be used to form a given solid-shape 101 that may be chicken egg shaped. In some embodiments, one or two drops of the fragrance may be added to each 80 mL of such dry mixture. In some exemplary embodiments, to each 80 mL of dry mixture (which has already been dry mixed), spray three to six sprays of a 50/50 mix by volume of witch hazel to isopropyl alcohol from a standard hand held and hand actuated liquid sprayer. This 50/50 mix may evaporate quickly, but may facilitate molding of solid-shape 101 into three dimensional shape 102. In some embodiments, the three to six sprays of a 50/50 mix by volume of witch hazel to isopropyl alcohol may be done between mixing of the mixture, for example, mix the mixture, then spray once, then mix the mixture, then spray again, and so on until three to six sprays may have been applied to the mixture. In some embodiments, the mixing itself of the mixture may be done with an automated mixer or via manual mixing.

In some embodiments, step 240 of preparing seed-enclosure 110 may comprise the steps of inserting at least one seed 112 and of optionally inserting at least one water gel bead 113, within at least one liquid water dissolvable capsule 111 (i.e. outer-layer 111); and then closing at least one liquid water dissolvable capsule 111 around the seed-enclosure contents. In some embodiments, at least one liquid water dissolvable capsule 111 along with at least one seed 112 inserted into the at least one liquid water dissolvable capsule 111 may form seed-enclosure 110.

In some embodiments of method 200, the first-mold and the second-mold may each comprise a respective interior surface, wherein when the first-mold and the second-mold may be compressed together, these respective interior surfaces may bound a volume of a shape substantially approximating and complimentary to an exterior of three dimensional shape 102.

In some embodiments, steps 260, 250, 230, and 220 may be replaced with a following series of steps: bringing the first-mold removably together with the second-mold, with seed-enclosure 110 disposed between the first-mold and the second-mold, so seed-enclosure 110 may be acting as a mold insert, and then pushing (e.g. injecting) the mixture into a mold cavity formed by the first-mold and the second-mold.

In some embodiments, between step 260 and step 270 may comprise a step of releasing seed growing device 100 from at least one of the molds. In some embodiments, between step 260 and step 270 may comprise a step of releasing seed growing device 100 from both molds. In some embodiments, either or both respective interior surface of the molds may be coated with a mold release agent (e.g. a lubricant) to facilitate mold release.

In some embodiments, step 270 of drying solid-shape 101, which may comprise seed-enclosure 110 at this stage (and seeds 112), may involve use of drying racks, drying while solid-shape 101 removably remains within one of the two molds, ambient room temperature drying, and/or forced drying using an oven, a tunnel, and/or forced air flow over solid-shape 101. In some embodiments, drying of solid-shape 101 may result in some shrinkage of solid-shape 101, such that substantially completing drying may be desirable to packaging steps. In some embodiments, at least two days may be used for ambient room temperature drying (e.g. at about 65 to about 78 degrees Fahrenheit and relative humidity less than 50%).

In some embodiments, dried and formed solid-shape 101, which may comprise seed-enclosure 110 at this stage, may then be packaged for shipment. In some embodiments, initial packaging may involve sealing each individual dried and formed solid-shape 101 within the moisture barrier covering. In some embodiments, the moisture barrier may be substantially transparent. In some embodiments, the moisture barrier covering may be shrink wrap. In some embodiments, shrink wrapping each individual dried and formed solid-shape 101 may be preferable over vacuum sealing each individual dried and formed solid-shape 101, as a force of a vacuum may cause premature collapse of three dimensional shape 102. In other embodiments, vacuum sealing each individual dried and formed solid-shape 101 may be used without causing premature collapsing three dimensional shape 102.

In some embodiments, either after initial packaging or in place of the initial packaging, a plurality of dried and formed solid-shape 101 may be packaged in egg crate packaging 501. See FIG. 5 series discussion below regarding egg crate packaging 501.

In some embodiments, method 200 may further comprise a step of adding a fragrance to seed puck(s) 900 (before packaging), such that when seed puck(s) 900 may be hydrated with liquid water, volatile chemicals of the fragrance may emit from seed puck(s) 900.

In some embodiments, method 200 may further comprise a step of adding at least one seed puck 900 to egg crate packaging 501.

Figure 3:
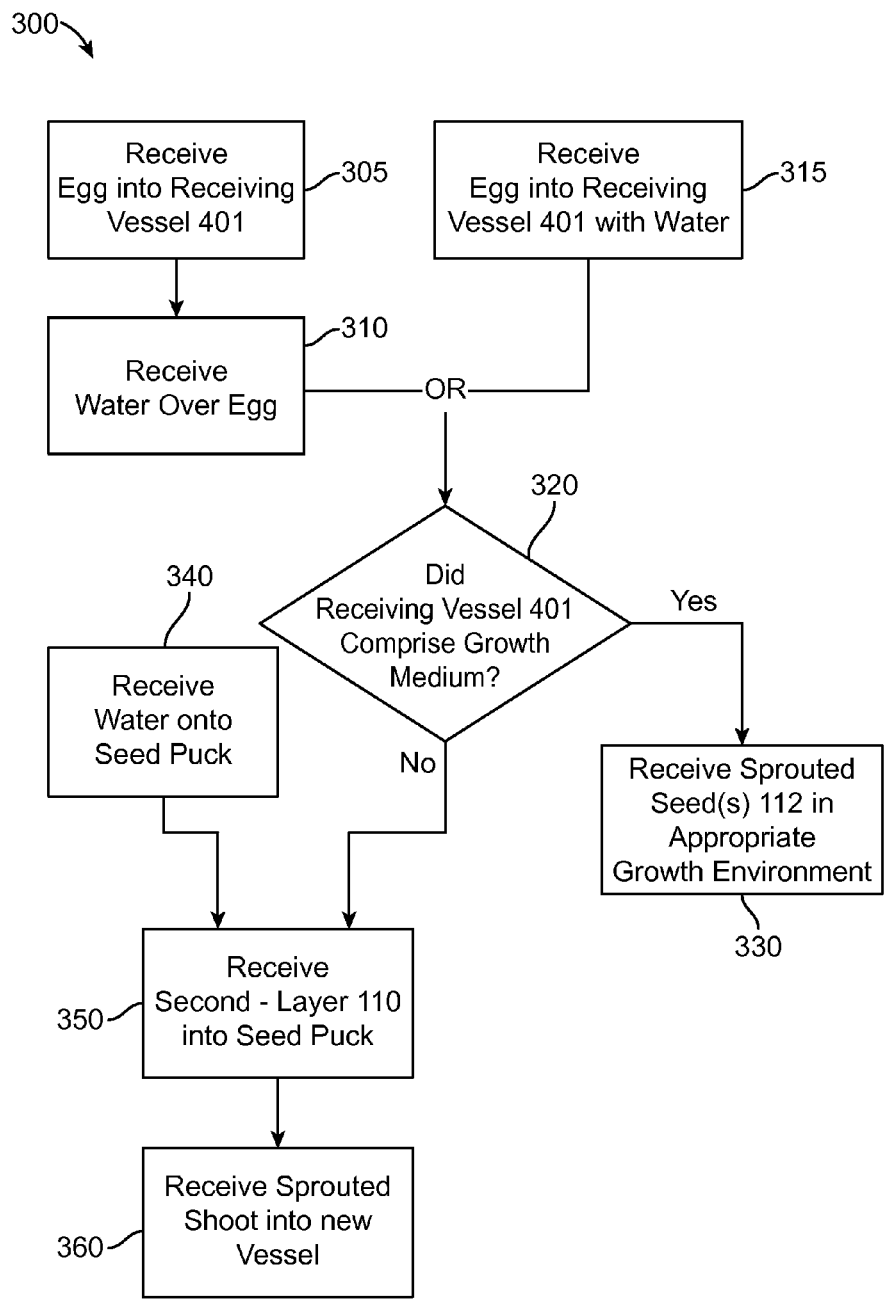
FIG. 3 may depict an exemplary method for using the exemplary embodiment of the seed growing device.

FIG. 3 may depict an exemplary method 300 for using the exemplary embodiment of seed growing device 100. Note, solid-shape 101 and/or three dimensional shape 102 may comprise "egg" as used in FIG. 3.

In some embodiments, method 300 for using seed growing device 100 may comprise a step of receiving seed growing device 100 into a receiving vessel 401. In FIG. 3, this may be step 305 or step 315. Step 305 and step 315 may differ in that step 305 may be followed by step 310, wherein liquid water may be received over dried and formed solid-shape 101 (e.g. "egg" in FIG. 3). Whereas in step 315, the liquid water may already be present in receiving vessel 401. That is, receiving vessel 401 may either comprise a volume of liquid water sufficient to activate the aqueous acid base chemical reaction of solid-shape 101 of seed growing device 100, wherein the solid-shape 101 may comprise the dry acid and the dry base; or the liquid water may be received over seed growing device 100 in the volume sufficient to activate the aqueous acid base chemical reaction. In some embodiments, a minimum "volume sufficient" may be a same volume as that occupied by a given three dimensional shape 102. In some embodiments, a minimum "volume sufficient" may be from a same volume as that occupied by a given three dimensional shape 102 up to five times the same volume as that occupied by a given three dimensional shape 102. In some embodiments, the minimum "volume sufficient" may be from about 5 mL to about 300 mL.

In some embodiments, receiving vessel 401 may be a vessel suitable for growing plants, such as a pot. See e.g., FIG. 4 series of figures. Continuing discussing FIG. 3, in some embodiments, receiving vessel 401 may be single cell 502 (see e.g., FIG. 5A). In some embodiments, receiving vessel 401 may a container suitable for holding water and/or soil, such as and without limitation, cups, mugs, buckets, bowls, dishes, and the like. In some embodiments, step 305 and/or step 315 may be preceded by a step of unwrapping each individual dried and formed solid-shape 101 from egg crate packaging 501 and/or from the moisture barrier covering.

In some embodiments, receiving vessel 401 may comprise a growth medium 402 (see e.g., FIG. 4B). In some embodiments, receiving vessel 401 may contain some growth medium 402 (see e.g., FIG. 4B). In some embodiments, growth medium 402 may comprise one or more of the group comprising: soil, potting soil, gardening soil, peat, moss, gravel, sand, vermiculite, fertilizer, manure, paper products (e.g. paper towels, napkins, tissues, and the like), fabrics, textiles, linens, and/or any other substrate suitable for germinating and/or growing plant seeds/spores. In step 320, if receiving vessel 401 may contain at least some growth medium 402, then method 300 may proceed to step 330, wherein receiving vessel 401 (or a different vessel) with sprouted seed(s) 112, may be then be located in an appropriate growth environment. For example, these steps of use may coincide with the FIG. 4 series of figures.

Continuing discussing FIG. 3, the appropriate growth environment may be specific to the type of plant(s) growing in receiving vessel 401 and may account for one or more of lighting characteristics (e.g. hours of daylight, shade, indirect sun, and the like), temperature characteristics, indoor or outdoor, humidity, possibility an applicable growing zone if not using artificial light and/or temperature sources, and the like. In some embodiments, the packaging may comprise a product insert, which may detail information with respect to the appropriate growth environment for the given seed(s) 112 that may be within seed growth device 100.

In step 320, if receiving vessel 401 may not contain growth medium 402, then method 300 may proceed to step 350, which may also require step 340 (e.g. a step of hydrating at least one seed puck 900, i.e. of at least one seed puck 900 receiving liquid water). In step 350, method 300 may further comprise a step of receiving seed-enclosure 110 into a hydrated seed puck(s) 900 (e.g. the center of the hydrated seed puck(s) 900), once solid-shape 101 may have substantially dissolved (e.g. at a point where seed-enclosure 110 may be seen and grabbed) and before seed-enclosure 110 substantially dissolves. Note, hydrated seed puck(s) 900 may be removably residing within a vessel (container). For example, and without limiting the scope of the present invention, this vessel may be single cell 502.

In some embodiments, method 300 may then proceed with step 360, a transplantation step, wherein sprouted shoot(s) from germinated seed(s) 112 may be received into a new vessel (e.g. a pot with growth medium 402), with or without seed puck(s) 900. In some embodiments, this new vessel may be receiving vessel 401.

The FIG. 4 series of figures may depict an exemplary example of seed growing device 100 use, that may be one exemplary application of method 300 discussed above in relation to FIG. 3. The FIG. 4 series of figures may comprise FIG. 4A through FIG. 4E.

FIG. 4A may depict an exemplary embodiment of seed growing device 100, shown from a perspective view. In FIG. 4A, three dimensional shape 102 may be depicted as an ovoid shape, in particular an ovoid shape similar to a chicken egg.

FIG. 4B may depict the exemplary embodiment of seed growing device 100 wherein seed growing device 100 may be received into receiving vessel 401, shown from a perspective view. In some embodiments, FIG. 4B may depict an example of step 305 of method 300. In FIG. 4B receiving vessel 401 may be a pot suitable for growing plants. However, in other embodiments, as noted in the FIG. 3 discussion of method 300, other receiving vessels 401 may replace this pot. In FIG. 4B, receiving vessel 401 may comprise at least some growth medium 402 (e.g. enough growth medium 402 sufficient to cover seed(s) 112). In FIG. 4B, growth medium 402 may be one or more of: soil, potting soil, gardening soil, peat, moss, gravel, sand, vermiculite, fertilizer, manure, paper products (e.g. paper towels, napkins, tissues, and the like), fabrics, textiles, linens, and the like. For example, and without limiting the scope of the present invention, seed puck(s) 900 may be a type of growth medium 402. A particular type of growth medium 402 may be based upon the particular type of seed(s) 112 included within seed growing device 100. In some embodiments, the product insert may specify the particular type of growth medium 402.

FIG. 4C may depict the exemplary embodiment of seed growing device 100 wherein seed growing device 100 may be receiving liquid water 403, shown from a perspective view. In some embodiments, FIG. 4C may depict an example of step 310 of method 300. In some embodiments, liquid water 403 may be poured over dried and formed solid-shape 101 (and unwrapped) until solid-shape 101 may be substantially bubbling and/or fizzing. In some embodiments, liquid water 403 may be poured over dried and formed solid-shape 101 until growth medium 402 may become wet.

FIG. 4D may depict the exemplary embodiment of seed growing device 100 wherein solid-shape 101 may be bubbling, fizzing, and/or dissolving upon becoming wet from liquid water 403, shown from a perspective view. FIG. 4D may depict an initial result of step 310 (or of step 315) of method 300.

Figure 4E:
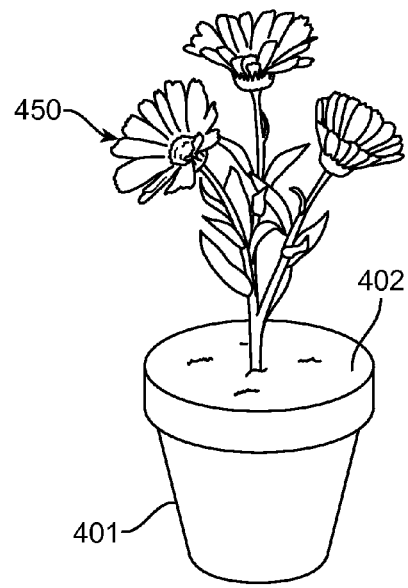
FIG. 4E may depict at least one flower now growing from at least one seed what may have been within the seed growing device, shown from a perspective view.

FIG. 4E may depict at least one flower 450 now growing, wherein at least one flower 450 may have originated from at least one seed 112, which in turn may have been within seed growing device 100, shown from a perspective view. According to the type of plant growing from seed(s) 112, at least one flower 450 may have required a location within the appropriate growth environment to result in at least one flower 450. According to the type of plant growing from seed(s) 112, at least one flower 450 may have required various watering schedules. In some embodiments, such appropriate growth environments and/or watering schedules may have been specified in the product insert.

For example, and without limiting the scope of the present invention, in some embodiments, seed 112 may take about two days to visibly sprout (as seen by the naked eye). For example, and without limiting the scope of the present invention, in some embodiments, seed 112 may take about a week to visibly sprout. For example, and without limiting the scope of the present invention, in some embodiments, seed 112 may take about 1.5 to 2 months to blossom(s).

Figure 5A:
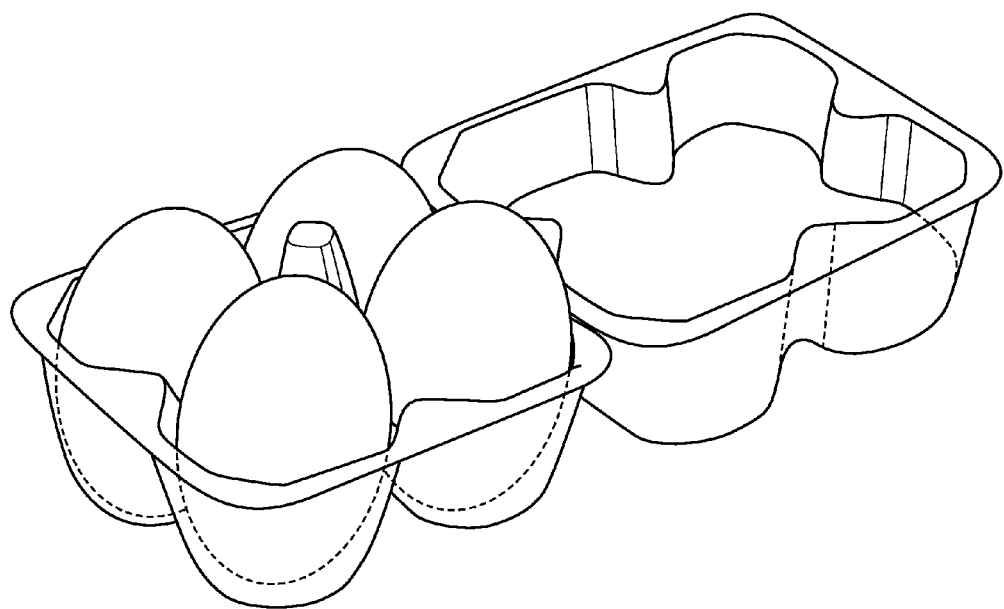
FIG. 5A may depict an exemplary embodiment of an egg crate packaging for packaging the seed growing device, with a lid open and with seed growing device depicted, all shown from a top perspective view.
Figure 5B:
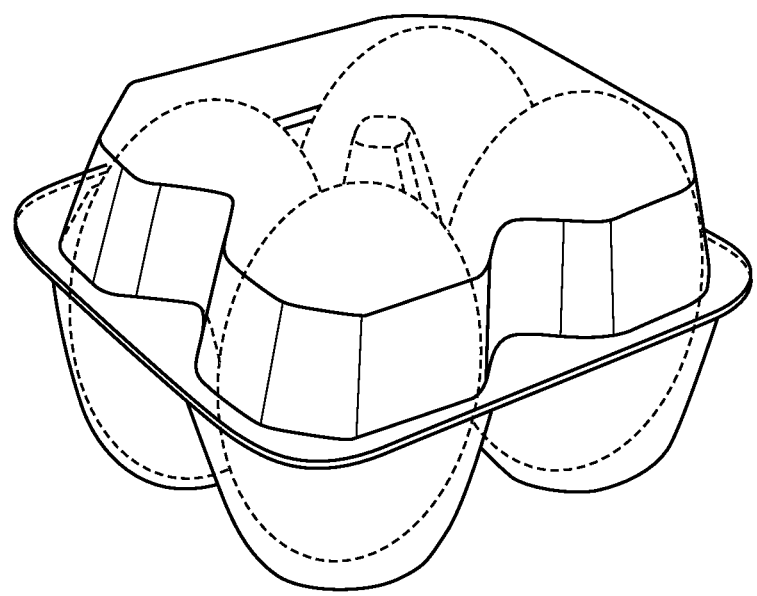
FIG. 5B may depict an exemplary embodiment of the egg crate packaging for packaging the seed growing device, with a lid closed and with seed growing device depicted within the egg crate, all shown from a top perspective view.
Figure 5C:
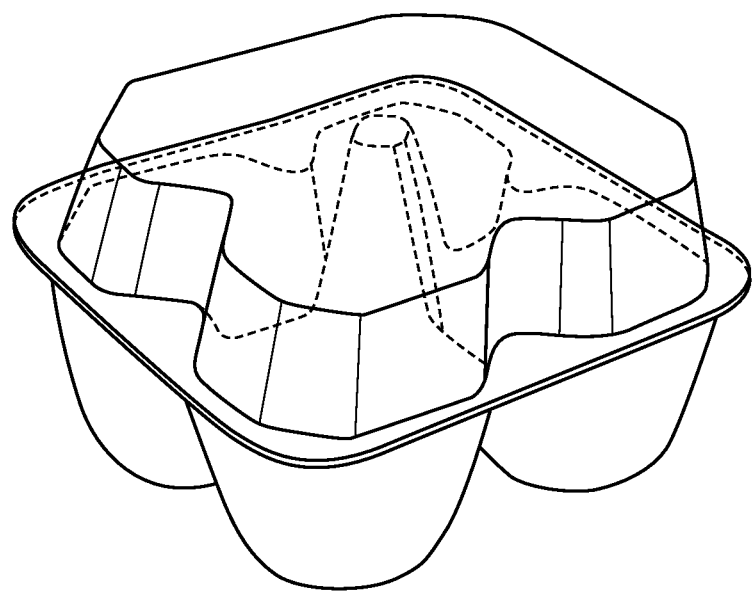
FIG. 5C may depict an exemplary embodiment of the egg crate packaging for packaging the seed growing device, with no seed growing devices depicted, shown from a top perspective view.

The FIG. 5 series of figures, FIG. 5A through FIG. 5C, may depict a packaging embodiment for seed growing device 100. FIG. 5A may depict an exemplary embodiment of egg crate packaging 501 for packaging seed growing device 100, with lid open 403 and with seed growing device 100 depicted, all shown from a top perspective view. FIG. 5B may depict an exemplary embodiment of egg crate packaging 501 for packaging the seed growing device 100, with lid 403 closed and with seed growing devices 100 depicted within egg crate packaging 501, all shown from a top perspective view. FIG. 5C may depict the exemplary embodiment of egg crate packaging 501 for packaging seed growing device 100, with no seed growing devices 100 depicted, shown from a top perspective view.

In some embodiments, seed growing device 100 may comprise packaging. In some embodiments, such packaging may comprise egg crate packaging 501, such that each three dimensional shape 102 selected from a plurality of three dimensional shapes 102 may removably reside in a single cell 502 of egg crate packaging 501. Each single cell 502 may comprise a complimentary contour to removably fit a portion of three dimensional shape 102. In some embodiments, egg crate packaging 501 may comprise four, six, eight, ten, twelve, of the like of single cells 502. Each single cell 502 of a given egg crate packaging 501 may be all be single integral article of manufacture. Each egg crate packaging 501 may comprise at least one lid 503 for removably sealing egg crate packaging 501 to protect the plurality of three dimensional shape 102, removably residing in each single cells 502. In some embodiments, egg crate packaging 501 may be substantially constructed of a thermoformed plastic. In some embodiments, such a thermoformed plastic may be a foam. In some embodiments, such a thermoformed plastic may be substantially transparent. A shape of egg crate packaging 501 may be formed by injection molding. In some embodiments, egg crate packaging 501 may be substantially constructed of a water dissolvable plastic. In some embodiments, egg crate packaging 501 may be substantially constructed of a paper based product.

In some embodiments, egg crate packaging 501 may be used receiving vessel 401, to receive seed growing device 100 (600 and/or 700), seed-enclosure 110, and/or at least one seed 112.

In some embodiments, materials of construction for egg crate packaging 501 may also comprise at least one seed 112 mixed into such materials of construction, such that egg crate packaging 501 itself may be planted into growth medium 402 and watered for seed(s) 112 germination.

In some embodiments, each three dimensional shape 102 removably fitting into each single cell 502 may be individually covered (wrapped) in the moisture barrier covering (e.g. shrink wrap in some embodiments.)

In some embodiments, egg crate packaging 501 may comprise at least one seed puck 900. In some embodiments, at least one seed puck 900 may be located within or on egg crate packaging 501.

In some embodiments, the present invention may be described, disclosed, and claimed as a system for growing seeds. In some embodiments, this system may comprise seed growing device 100 as discussed above. For example, and without limiting the scope of the present invention, in some embodiments seed growing device 100, may comprise: solid-shape 101 comprising the mixture; wherein the mixture may comprises at least the dry acid and the dry base; seed-enclosure 110 which may be entirely encapsulated by solid-shape 101 (once three dimensional shape 102 may be formed); wherein seed-enclosure 110 may comprise the seed-enclosure contents, wherein the seed-enclosure contents may comprise at least one seed 112; wherein at least a portion of seed-enclosure 110 (e.g. outer-layer 111) may be dissolvable upon contact with the liquid water; wherein when the liquid water may be poured onto seed growing device 100, the dry acid and the dry base may absorb at least some of the liquid water to interact in the aqueous acid base chemical reaction causing bubbling and transitioning from the dry state into the liquid state of solid-shape 101; and wherein at least some of the liquid water may dissolve the portion of seed-enclosure 110 enough to permit some of the liquid water to reach the at least one seed 112 and initiate seed germination.

In some embodiments, the system may comprise the moisture barrier covering. In some embodiments, the moisture barrier covering may entirely cover solid-shape 101 (once three dimensional shape 102 may be formed), protecting solid-shape 101 from moisture. For example, and without limiting the scope of the present invention, the moisture barrier covering may comprise shrink wrap.

FIG. 9 may depict an exemplary embodiment of at least one seed puck 900, shown from a perspective view. In some embodiments, the system may comprise at least one seed puck 900. In some embodiments, at least one seed puck 900 (after being hydrated) may be used to receive seed-enclosure 110 upon solid-shape 101 being activated with the liquid water and prior to outer-layer 111 dissolving (completely). That is, in some embodiments, hydrated seed puck(s) 900 may be used as a medium to germinate seed(s) 112.

In some embodiments, the system may comprises egg crate packaging 501, such that each three dimensional shape 102 selected from a plurality of three dimensional shapes 102 may removably reside in each single cell 502 of egg crate packaging 501.

In some embodiments of the system, egg crate packaging 501 may comprise at least one seed puck 900. For example, and without limiting the scope of the present invention, the at least one seed puck 900 may be an insert removably located within egg crate packaging 501.

Figure 6:
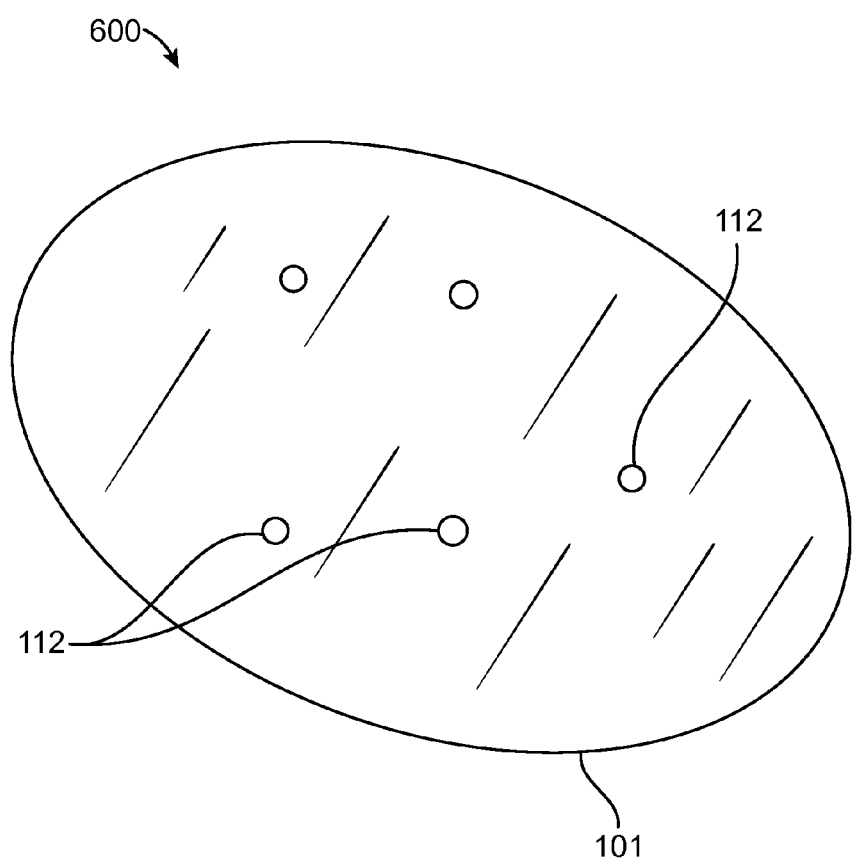
FIG. 6 may depict an exemplary embodiment of a seed growing device, wherein at least one seed may be dispersed within a mixture with no seed-enclosure, shown from a longitudinal cross section view.

FIG. 6 may depict an exemplary embodiment of a seed growing device 600, wherein at least one seed 112 may be dispersed within seed growing device 600, shown from a longitudinal cross section view. In some embodiments of seed growing device 600 there may be no seed-enclosure 110, and no outer-layer 111. In some embodiments, at least one seed 112 may be dispersed within the mixture. Otherwise the discussion pertaining to seed growing device 100 may be applicable to seed growing device 600, e.g., seed growing device 600 may comprise solid-shape 101.

In some embodiments, seed growing device 600 may comprise solid-shape 101, and at least one seed 112. In some embodiments, solid-shape 101 may comprise three dimensional shape 102. In some embodiments, at least one seed 112 may be disposed within or on (e.g. an exterior) solid-shape 101. In some embodiments, when solid-shape 101 may be wetted with at least liquid water, solid-shape 101 may substantially dissolve within a time limit exposing at least one seed 112 to at least some of the at least liquid water initiating germination. Substantially dissolve in this context may mean that an original three dimensional shape 102 may have transformed into a different shape and/or that the original three dimensional shape 102 may no longer be visually recognizable as the original three dimensional shape 102, as observed with the naked eye. In some embodiments, this time limit may be selected from the group comprising: about thirty seconds, about one minute, about two minutes, about three minutes, about five minutes, about 10 minutes, about 15 minutes, about 30 minutes, about 45 minutes, about one hour, about two hours, about three hours, about six hours, about twelve hours, about one day, and the like. In some embodiments, this time limit may vary from about thirty seconds to about two days.

In some embodiments, solid-shape 101 may comprise the mixture. In some embodiments, mixture may be substantially constructed of one or more of: acetic acid (dry form), citric acid (dry form), porcelain, clay, plaster, paper, water dissolvable plastic, powdered bonding agents, liquid glues, flour (not limited to wheat based), icing (frosting), soils, fertilizers, salts, borax, bromine, stearic acid, baking soda, creme of tartar, shea butter, and the like. The clay may comprise one or more of powered, liquid, kaolin, dry, and/or wet clays. The paper may comprise one or more of molded paper products, shredded paper products, paper mache, and/or the like. The water dissolvable plastic may comprise water soluble styrofoams and/or other water dissolvable plastics. In some embodiments, the clay, the plaster, the paper, and the water dissolvable plastic may be water soluble.

But note, some seed growing device 600 embodiments may not include both acids and bases.

In some embodiments, the mixture may comprise at least species A and at least species B. In some embodiments, the at least species A may be at least one dry acid. In some embodiments, the at least species B may be at least one dry base. The above disclosure with respect to acids and bases may be applicable to such seed growing device 600 embodiments. In some embodiments, the at least one dry acid and the at least one dry base may absorb at least some of the at least liquid water to interact in an aqueous acid base chemical reaction causing bubbling and transitioning solid-shape 101 away from a dry state and into a liquid state or a slurry state.

In some embodiments, solid-shape 101 may comprise a plurality of gas bubble nucleation sites located at one or more of externally on solid-shape 101 and/or within solid-shape 101. In some embodiments, solid-shape 101 may create the plurality of gas bubble nucleation sites externally on solid-shape 101, by solid-shape comprising an external surface may be microscopically rough and/or microscopically porous. In some embodiments, an interior of solid-shape 101 may be microscopically porous to form the plurality of gas bubble nucleation sites. In some embodiments, the at least liquid water may comprise dissolved carbon dioxide. In some such gas nucleation site embodiments, the mixture comprising solid-shape 101 may comprise one or more of: sugar, glucose syrup, hydrogenated coconut oil, carnauba wax, dextrin, natural flavor, rice starch, and gum Arabic.

In some embodiments, the at least liquid water comprising dissolved carbon dioxide may be soda water and/or various beverage sodas. In some embodiments, the at least liquid water may comprise a surfactant, such as, but not limited to, a soap and/or aspartame. Such surfactants may lower surface tension which in turn may facilitate bubble formation. In some embodiments, the plurality of gas bubble nucleation sites may facilitate bubbling and release of carbon dioxide gas upon solid-shape 101 contact with the at least liquid water comprising the dissolved carbon dioxide.

In some such gas nucleation site embodiments, seed-enclosure 110 may be incorporated as well, e.g. with seed-enclosure 110 located within solid-shape 101.

Figure 7:
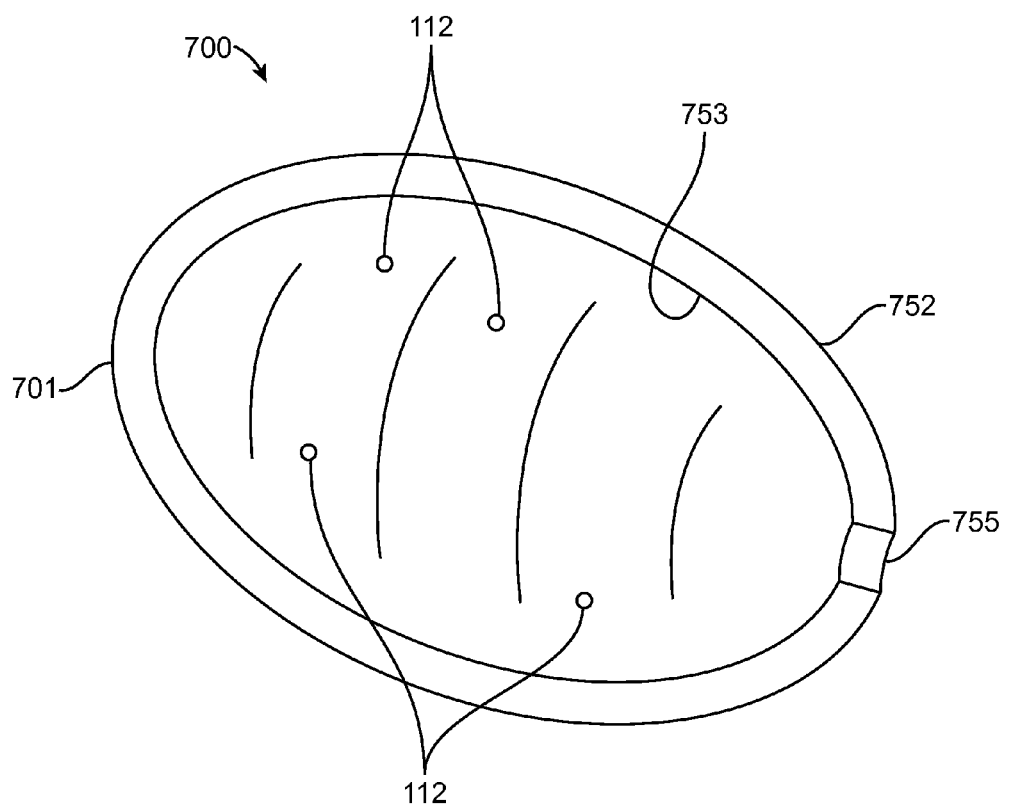
FIG. 7 may depict an exemplary embodiment of an exterior shell of a seed growing device, shown from a longitudinal cross section view.

FIG. 7 may depict an exemplary embodiment of a seed growing device 700, wherein in some embodiments, seed growing device 700 may comprise an exterior shell 701, and at least one seed 112. FIG. 7 may be shown from a longitudinal cross-sectional view. In some embodiments, exterior shell 701 may comprise an exterior surface 752 and disposed opposite an interior surface 753, disposed by a thickness of exterior shell 701. In some such exterior shell embodiments, solid-shape 101 may be replaced with exterior shell 701. In some embodiments, exterior shell 701 may comprise a shape, wherein the shape may be selected from eligible shapes as discussed for three dimensional shape 102 (or solid-shape 101). That is, exterior shell 701 may comprise three dimensional shape 102. In some embodiments, three dimensional shape 102 (or exterior shell 701) may substantially enclose a volume. In some embodiments, the interior of exterior shell 701 may substantially bound the volume. In some embodiments, at least one seed 112 may be located at one or more of attached to the exterior surface 752, attached to the interior surface 753 within the volume, within the volume, or within a material of construction of the exterior shell 701. In some embodiments, within the interior of exterior shell 701 (i.e. the volume), at least one seed 112 may be attached to interior surface 753 of exterior shell 701. In some embodiments, within this volume may be disposed at least one seed 112. In some embodiments, within this volume may be disposed at least one seed 112 and at least some growth medium 402.

In some embodiments, exterior shell 701 may be substantially constructed from a material of construction, which in some embodiments, may be an applicable material. In some embodiments, this material of construction may be dissolvable upon contact with liquid water. In some embodiments, exterior shell 701 may be formed by applying a layer (i.e. coat) of the applicable material to interior surfaces of an appropriate mold. These interior surfaces of the appropriate mold may bound the volume of a shape substantially approximating and complimentary to the exterior of three dimensional shape 102, which may form the shape of exterior shell 701.

In some embodiments, exterior shell 701 may comprise at least one entrance/exit hole 755 running from exterior surface 752 to interior surface 753, wherein such hole(s) 755 may permit liquid water to enter into the interior, to germinate seed(s) 112. In some embodiments, wherein the material of construction for exterior shell 701 may be substantially water soluble, such hole(s) 755 may not be necessary, but may still be present in some embodiments. In some embodiments, wherein the material of construction for exterior shell 701 may be substantially water insoluble (e.g. porcelain), such hole(s) 755 may be necessary and present.

In some embodiments, in terms of materials of construction, exterior shell 701 may be substantially constructed of one or more of: porcelain, clay, plaster, paper, water dissolvable plastic, powdered bonding agents, liquid glues, flour (not limited to wheat based), icing (frosting), soils, fertilizers, salts, borax, bromine, stearic acid, baking soda, creme of tartar, shea butter, and the like. The clay may comprise one or more of powered, liquid, kaolin, dry, and/or wet clays. The paper may comprise one or more of molded paper products, shredded paper products, paper mache, and/or the like. The water dissolvable plastic may comprise water soluble styrofoams and/or other water dissolvable plastics. In some embodiments, the clay, the plaster, the paper, and the water dissolvable plastic may be water soluble. In some embodiments, the applicable material (e.g. used to at least coat interior surfaces of the appropriate mold) may be the one or more of porcelain (e.g., but not limited to, porcelain slip), clay, plaster, paper, water dissolvable plastic, and the other exterior shell materials of construction, but in a slurry state, a liquid state, and/or a high viscosity state (e.g. a viscosity of at least honey or molasses), i.e. in a workable state.

In some embodiments, the applicable material may also comprise at least one seed 112, such that at least one seed 112 may be dispersed within the applicable material which forms exterior shell 701.

In terms of use, such seed growing devices comprising exterior shell 701, once formed, cured, dried, and with at least one seed 112, may then be planted in growth medium 402, either completely buried, partially buried, or laying on top of growth medium 402. In some embodiments, such seed growing devices may be intentionally cracked by the user or not, to facilitate, liquid water access to seed(s) 112 for germination.

Figure 8:
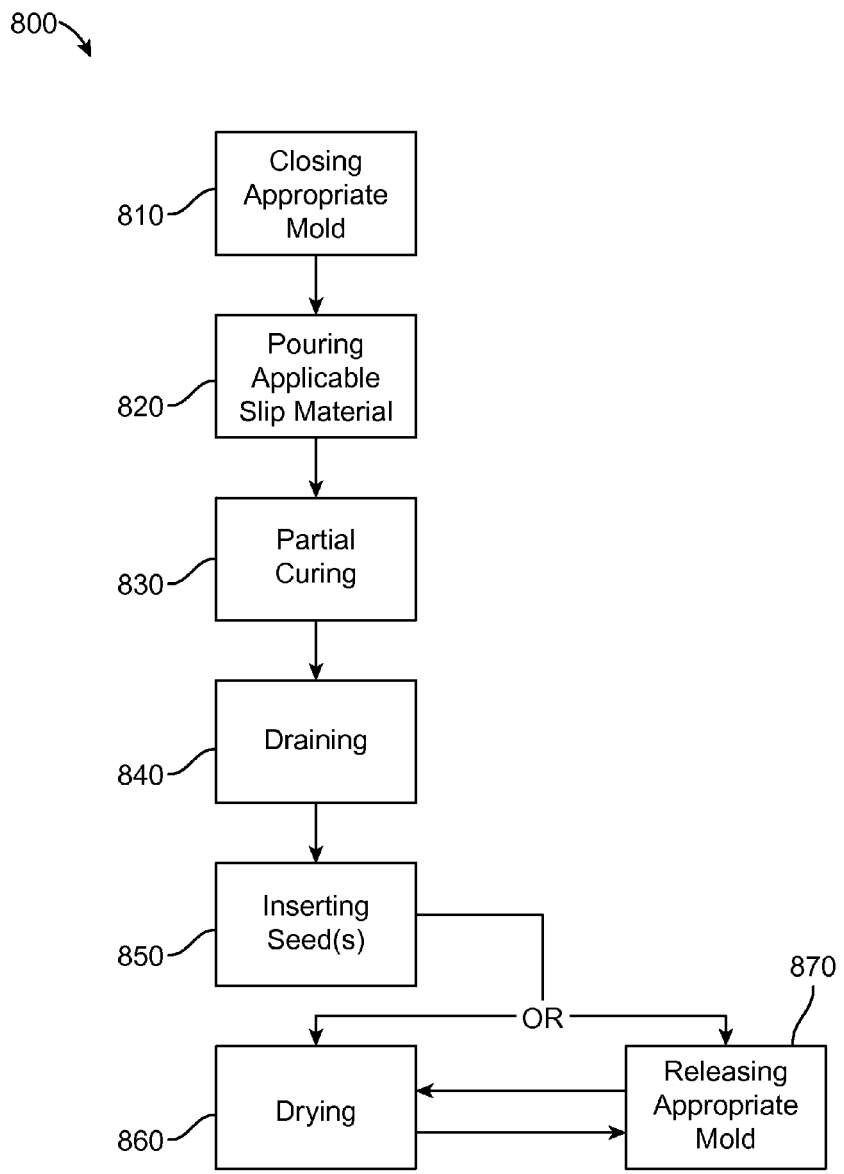
FIG. 8 may depict an exemplary embodiment of a method for slip cast formation of an exterior shell of a seed growing device, shown as a flow diagram.

FIG. 8 may depict an exemplary embodiment of a method 800 for slip cast formation of an exterior shell 701 of seed growing device 700, shown as a flow diagram. In some embodiments, exterior shell 701 may be made by slip casting. In some embodiments, making exterior shell 701 via slip casting may comprise the steps of:

Step 810: Closing (sealing) the appropriate mold, aside from at least one entrance/exit hole 755 for receiving and subsequent draining of an applicable slip material, which may be the applicable material.

Step 820: Pouring a volume of the applicable slip material (e.g., but not limited to, porcelain slip, plaster slurry, paper mache slurry, and the like) through the at least one entrance/exit hole 755 to coat interior surface 753. In some embodiments, the volume may comprise substantially a same volume as formed by the interior of the appropriate (sealed) mold. In some embodiments, the volume may comprise a sufficient volume to coat about half of the interior of the appropriate mold, and the appropriate mold may be rotated to coat substantially all of any remaining interior of the appropriate mold which may yet to be coated with the applicable slip material.

Step 830: Partial curing. In some embodiments, allow sufficient time for the applicable slip material that may be in contact with the interior of the appropriate mold to cure to at least a point where flow of the applicable slip material may be slowed considerably. In some embodiments, e.g., using porcelain slip, this sufficient time may be from about 5 minutes to about forty five minutes.

Step 840: Drain (empty) substantially any uncured (still flowable) applicable slip material from the at least one entrance/exit hole 755.

Step 850: Through the at least one entrance/exit hole 755, insert at least one seed 112. In some embodiments, at least one seed 112 may be inserted with applicable slip material may be tacky, such that at least one seed 112 may stick to the applicable slip material as it cures. In some embodiments, the at least one seed 112 may be inserted through the at least one entrance/exit hole 755 after the applicable slip material may not be tacky. In some embodiments, through the at least one entrance/exit hole 755, insert at least some growth medium 402 as well as at least one seed 112.

Step 860: In some embodiments, prior to releasing the appropriate mold, a newly formed exterior shell with at least one seed 112, and optionally growth medium 402 in some embodiments, may be further dried, for at least two hours in some embodiments. In some embodiments, such drying may be about 8 hours to about 26 hours. In some embodiments, such drying may be about 2 hours to about 72 hours. Step 860 may be optional in some embodiments.

Step 870: In some embodiments, release the appropriate mold to remove a newly formed exterior shell 701.

In some embodiments, the at least one entrance/exit hole 755 may be sealed with a plug. In some embodiments, the at least one entrance/exit hole may be 755 removably sealed with the plug. In some embodiments, the plug and the at least one entrance/exit hole 755 may comprise complimentary mating surfaces. In some embodiments, the plug may be substantially constructed of the applicable slip material. In some embodiments, the plug may be ceramic. In some embodiments, the plug may be cork.

In some embodiments, exterior shell 701 may be planted in growth medium 402 with the at least one entrance/exit hole 755 buried in growth medium 402.

In some embodiments, the above slip casting method for making exterior shell 701 may be modified for use of the applicable slip material of clay, wherein the clay may be applied to the interior of the appropriate mold, while the appropriate mold may not be closed, then at least one seed 112 may be pressed into such clay (before the clay has dried), and then two or more parts of the appropriate mold may be joined to form one continuous exterior shell constructed substantially of clay. In some embodiments, drying before mold release may require a minimum of 12 hours. In some embodiments, drying before mold release may require a minimum of 24 hours.

In some embodiments, exterior shell 701 may be solid-shape 101, wherein the applicable material may substantially fill the volume of the appropriate mold, see e.g., FIG. 6. In such embodiments, there may be no interior surface 753.

In some embodiments, the applicable material may also comprise at least one seed 112, such that at least one seed 112 may be dispersed within the applicable material which forms exterior shell 701 and solid-shape 101. Whereas, in some embodiments, a mold insert may be used to form a cavity within exterior shell 701 and solid-shape 101 to receive at least one seed 112, and optionally some growth medium 402 in some embodiments. Or in some embodiments, such a cavity may be formed by inserting and removing the mold insert through a portion of exterior shell 701 and into a portion of solid-shape 101 before the applicable material has dried, but after sufficient time to allow the cavity to retain its shape upon removal of the mold insert. For example, and without limiting the scope of the present invention, with plaster as the applicable material, such time may be at about five minutes after appropriate mold packing for inserting and removing the mold insert to form the cavity. In some embodiments, an opening to the cavity may be sealed (removably sealed in some embodiments) by the plug. In some embodiments, such an opening may be structurally and/or functionally the same as at least one entrance/exit hole 755. For example, and without limiting the scope of the present invention, with plaster as the applicable material, mold release may occur at about 25 minutes, wherein after release, the newly formed exterior shell and solid-shape 101 may be further dried.

Note, the various molds discussed herein may be substantially constructed of one or more of the materials of aluminum, steel, silicone, rubber, plastic, wood, and/or any other material suitably hard to be used as mold for the purposes discussed herein.

Note, the word "about" may be used herein in reference to some unit call outs, and when used herein in that capacity, unless otherwise explicitly stated, "about" may be mean plus or minus one minute, plus or minus one percent, plus or minus one mL, and the like.

Note, as used herein the word "substantially" may be used to indicate that it may not be necessary to meet an absolute standard in whichever sentences "substantially" may be used. For example, and without limiting the scope of the present invention, substantially approximating a certain shape need not require an exact copying of the certain shape. For example, and without limiting the scope of the present invention, substantially as used in the context of materials of construction may mean component may comprise other materials in lesser quantities than the material explicitly called out. For example, and without limiting the scope of the present invention, substantially as used in the context of matching a called out color (e.g. white or yellow) may mean an exact match with called out color is not required. For example, and without limiting the scope of the present invention, substantially as used in the context of "substantially impermeable to liquid water and/or gaseous water vapor" may not require absolute perfect water impermeability. For example, and without limiting the scope of the present invention, substantially as used in the context of "substantially dissolved" may mean the component dissolving need not be completely dissolved before subsequent processes may occur.

A seed growing device, a system for growing seeds using the seed growing device, and a method for growing seeds using the seed growing device have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:
1. A seed growing device comprising:
a solid-shape, wherein the solid-shape has a three dimensional shape; wherein the solid-shape comprises a mixture of at least one dry acid and at least one dry base;
at least one seed disposed within or on the solid-shape;
wherein when the solid-shape is wetted with at least liquid water, the at least one dry acid and the at least one dry base absorb at least some of the at least liquid water to interact in an aqueous acid base chemical reaction causing bubbling and transitioning the solid-shape away from a dry state such that the solid-shape substantially dissolves within a time limit exposing the at least one seed to the at least liquid water initiating seed germination.

2. The seed growing device according to claim 1, wherein the at least one dry acid is one or more of citric acid in powder form or acetic acid in powder form; and wherein the at least one dry base is baking soda in powder form.

3. The seed growing device according to claim 1, wherein the mixture comprises one or more of the group consisting of: a binding agent, a sugar, a fragrance, a surfactant, witch hazel, and isopropyl alcohol.

4. The seed growing device according to claim 3, wherein the binding agent is corn starch.

5. The seed growing device according to claim 1, wherein the solid-shape comprising the three dimensional shape is molded into the three dimensional shape by use of a mold or a press.

6. The seed growing device according to claim 1, wherein the solid-shape is an ovoid.

7. The seed growing device according to claim 1, wherein the seed growing device comprises egg crate packaging; wherein the egg crate packaging comprises at least one single cell, wherein the single cell is sized to removably receive at least one of the solid-shape selected from a plurality of solid-shapes.

8. The seed growing device according to claim 7, wherein the egg crate packaging comprises at least one seed puck; wherein the at least one seed puck is used to receive the at least one seed upon the solid-shape being transitioned away from the dry state upon contact with the at least liquid water.

9. The seed growing device according to claim 1, wherein the solid-shape is a white color to mimic a color of cooked chicken egg whites.

10. The seed growing device according to claim 1, wherein the at least one seed is selected from one or more of the group consisting of at least one type of flowering plant and of at least one type of non-flowering plant.

11. The seed growing device according to claim 1, wherein the seed growing device further comprises a seed-enclosure entirely encapsulated within the solid-shape; wherein the seed-enclosure comprises seed-enclosure contents, wherein the seed-enclosure contents comprises the at least one seed; wherein the seed-enclosure comprises an outer-layer that is dissolvable upon contact with the at least liquid water; and wherein when at least some of the at least liquid water dissolves the seed-enclosure enough to permit some of the at least liquid water to reach the at least one seed, seed germination then initiates.

12. The seed growing device according to claim 11, wherein the outer-layer comprises at least one liquid water dissolvable capsule.

13. The seed growing device according to claim 11, wherein the seed-enclosure contents comprises at least one water gel bead sized to fit within the seed-enclosure.

14. The seed growing device according to claim 11, wherein the outer-layer is a yellow color to mimic a color of cooked chicken egg yolks.

15. The seed growing device according to claim 1, wherein the seed growing device comprises a moisture barrier covering, removably entirely covering the solid-shape, and protecting the solid-shape from moisture.

* * * * *